Oct. 1, 1957 — R. TAUBER — 2,808,079
BOOK BINDING MACHINE
Filed April 15, 1954 — 6 Sheets-Sheet 1

INVENTOR.
RUDOLF TAUBER
BY Albert F. Kronman
ATTORNEY

Oct. 1, 1957  R. TAUBER  2,808,079
BOOK BINDING MACHINE
Filed April 15, 1954  6 Sheets-Sheet 2
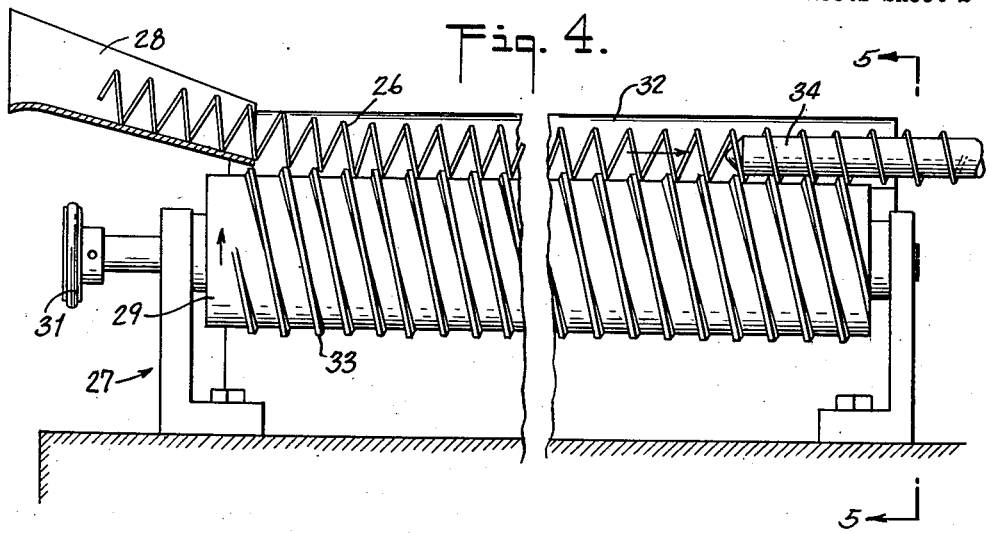
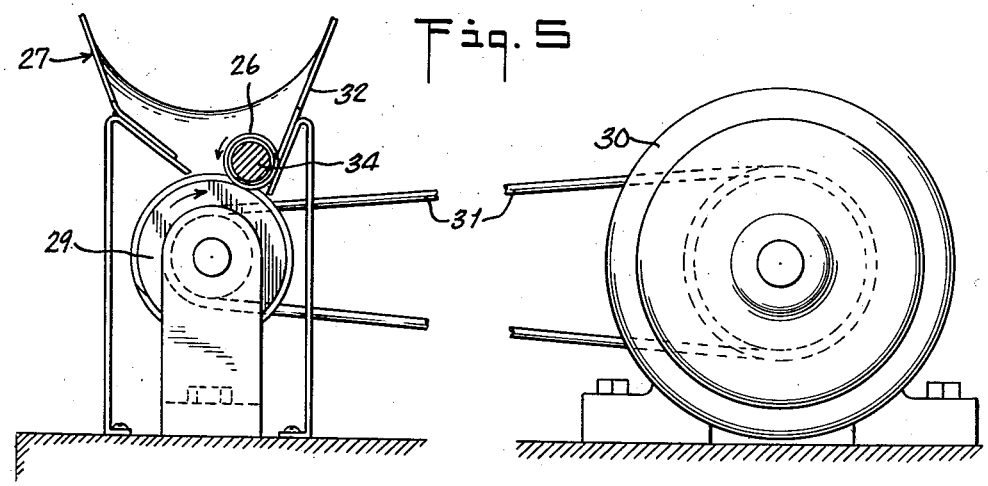
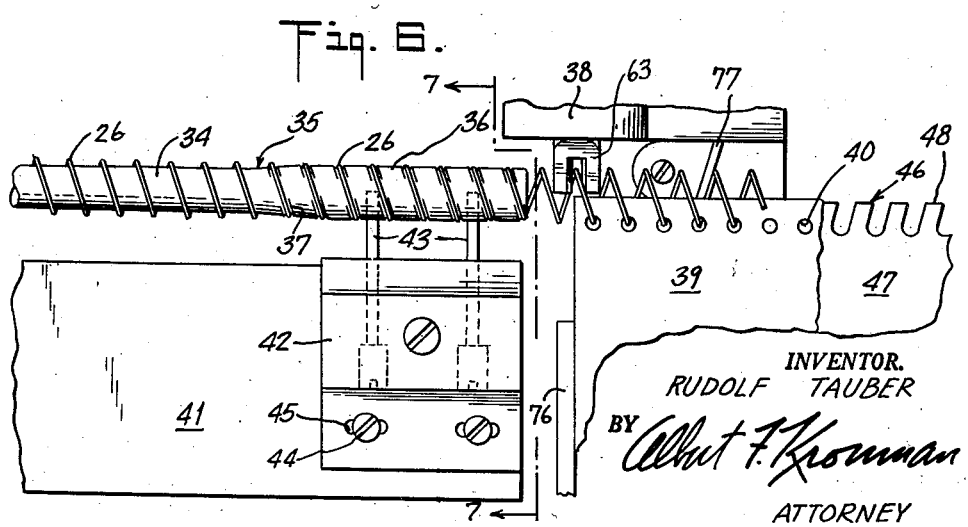
INVENTOR.
RUDOLF TAUBER
BY Albert F. Krosnan
ATTORNEY

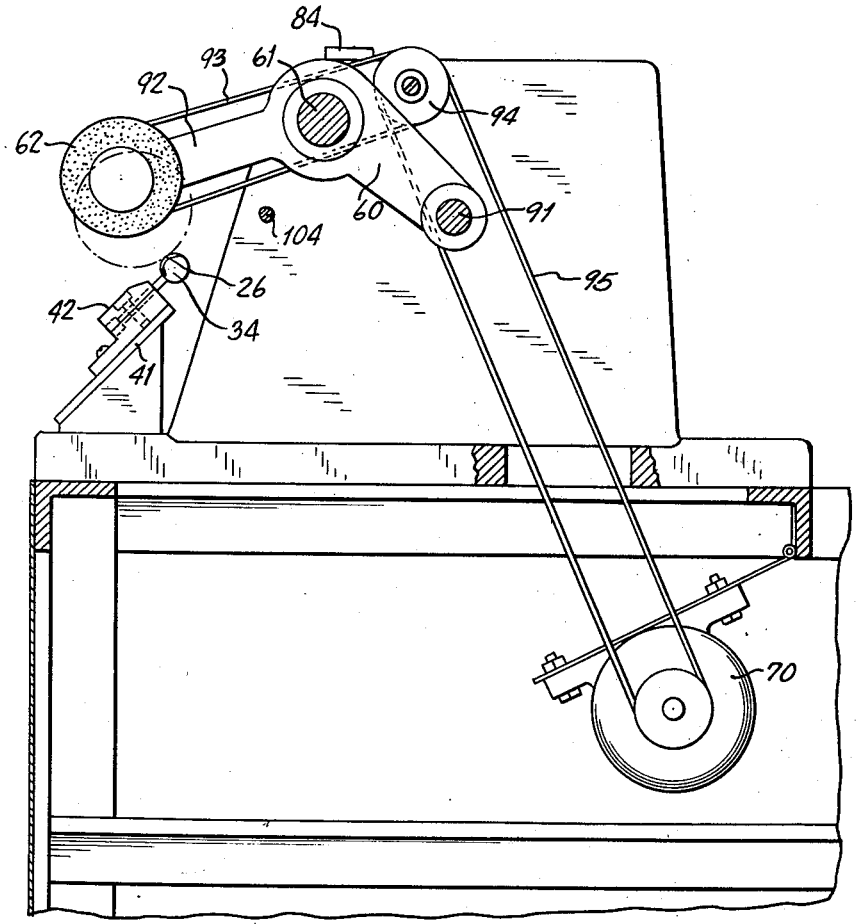
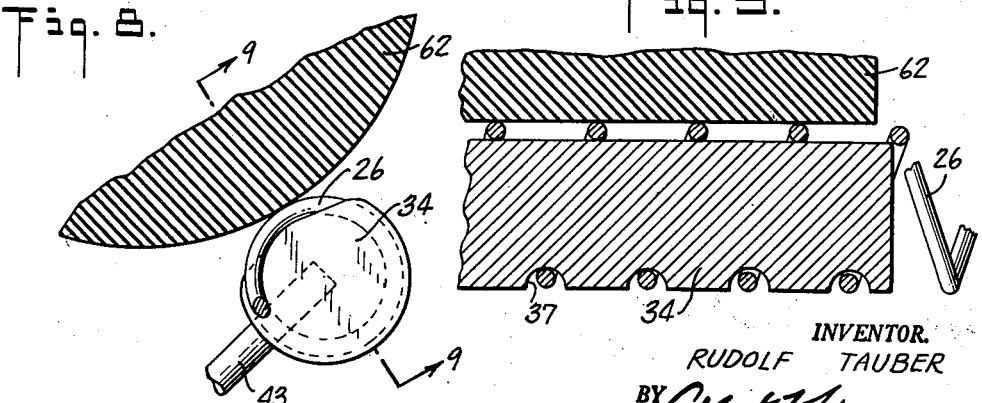

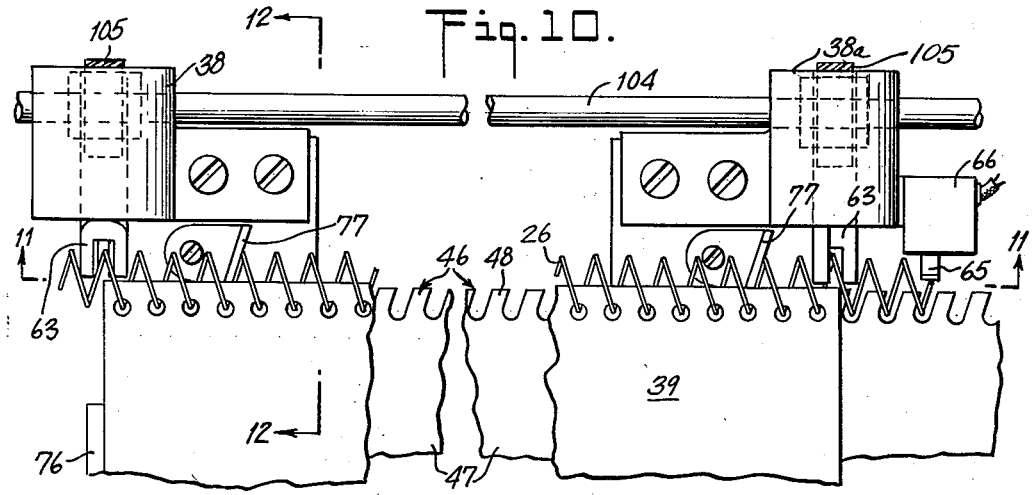
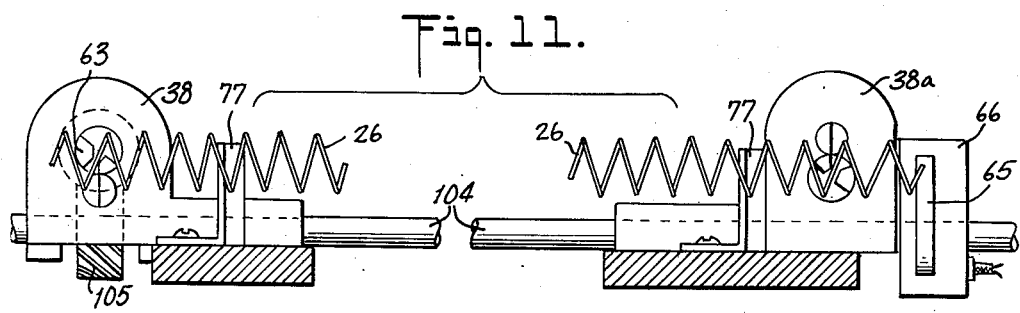
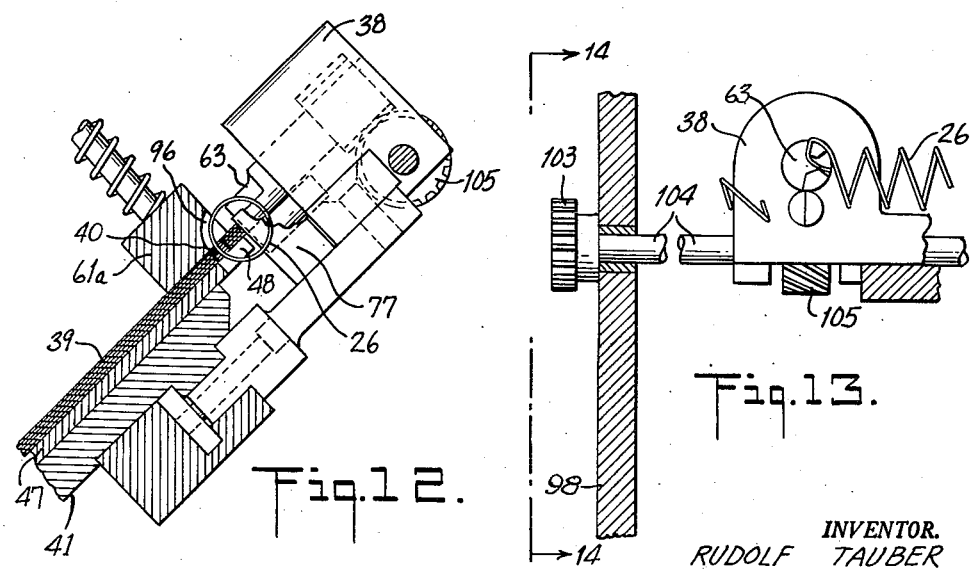
INVENTOR.
RUDOLF TAUBER
ATTORNEY

Oct. 1, 1957 R. TAUBER 2,808,079
BOOK BINDING MACHINE
Filed April 15, 1954 6 Sheets—Sheet 5

INVENTOR.
RUDOLF TAUBER
BY Albert F. Kronman
ATTORNEY

United States Patent Office

2,808,079
Patented Oct. 1, 1957

2,808,079

BOOK BINDING MACHINE

Rudolf Tauber, Brooklyn, N. Y., assignor to Tauber's Bookbindery, Inc., New York, N. Y., a corporation of New York Application April 15, 1954, Serial No. 423,284

6 Claims. (Cl. 140—92.3)

This invention relates to a device for binding books and more specifically to the binding of such books as are held together by means of a continuous spiral which is passed through a series of perforations along one margin of the sheaf of papers comprising the book.

It has been well known for some time to form books by punching a series of holes along one edge of the elements to be bound and thereafter insert a spiral of metal, plastic or the like into said perforations so as to hold the assembled sheaf of papers together. Such bindings, in addition to being attractive, permit the book to be laid flat upon opening and secure the pages in place with great permanence.

Previously known devices for inserting the spirals into the holes have been extremely cumbersome, complicated and expensive. In many cases, several operations were necessary to perform the binding act.

The various operations called for expensive handling of the pages and skilled operators.

Accordingly, it is an object of the present invention to provide a spiral binding machine which will function so as to secure the pages of a book in one operation.

Another object of the present invention is to provide a simplified book binding machine.

A further object of the present invention is to provide a book binding machine which may be used by unskilled operators.

Another object of the present invention is to provide a book binding machine which will occupy a minimum amount of floor space.

A further object of the present invention is to provide a spiral book binding machine which will operate dependably over long periods of use with trouble-free performance.

A feature of the present invention is its binding element feeding device.

Another feature of the present invention is its binding severing structure.

A further feature of the present invention is its inline, compact construction.

Another feature of the present invention is its open front construction which provides a maximum amount of safety to the operator.

A further feature of the present invention is its fully automatic operation which permits it to be used at speeds in excess of previously known devices.

The invention consists of the construction, combination and arrangement of parts, as herein illustrated, described and claimed.

In the accompanying drawings forming a part hereof, is illustrated one form of embodiment of the invention, in which drawings similar reference characters designate corresponding parts, and which:

Figure 4 is a front elevational fragmentary view, somewhat enlarged, of the spiral binding feeding device made in accordance with the present invention.

Figure 5 is a view taken on line 5—5 in Figure 4 looking in the direction of the arrows.

Figure 6 is a front elevational view, somewhat enlarged, showing the spiral feeding mandrel and the binding severing knife employed in the present invention.

Figure 7 is a section taken on line 7—7 in Figures 1 and 6 looking in the direction of the arrows.

Figure 8 is a fragmentary cross sectional view, somewhat enlarged, showing the spiral driving means as applied to the spiral binding element during the binding operation.

Figure 9 is a sectional view taken on line 9—9 in Figure 8 looking in the direction of the arrows.

Figure 10 is a view in front elevation, somewhat enlarged, partially cut away to show the underlining structure at the end of the binding operation and prior to the severing portion of the cycle.

Figure 11 is a view taken on line 11—11 in Figure 10, looking in the direction indicated by the arrows.

Figure 12 is a view taken on line 12—12 in Figure 10.

Figure 13 is a fragmentary view of the twist severing device shown in Figures 10 and 11, as it appears at the end of the severing operation.

Figure 1:
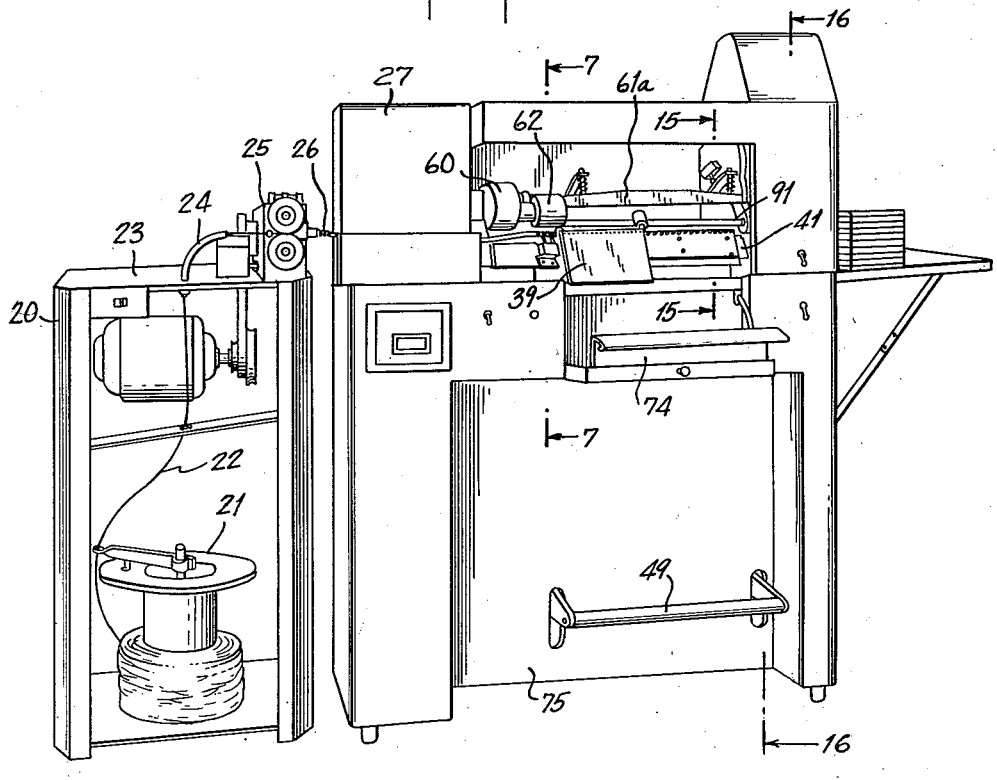
Figure 1 is a view in front elevation of a complete embodiment of the present invention showing a sheaf of papers in position ready to be bound.

Referring to the drawings, and specifically Figure 1, 20 indicates a cabinet, in the base of which there is rotatably supported a reel 21 of wire 22, or some other similar material, which may be formed into a flexible spiral binding element.

The wire 22 is led through the top 23 of the cabinet 20 by way of a guide 24 and into a spiral forming head 25. The spiral forming head, which may be of conventional design, fashions the wire 22 into a continuous spiral, best shown in Figures 2, 4, 6 and 11.

The continuous spiral 26 is fed out of the forming head 25, from which it is led into a feeding mechanism generally indicated at 27. (Figures 1 and 4.) After a suitable length of the spiral 26 has been formed by the head 25, the spiral is cut and the forming mechanism stopped, in the well known manner.

The formed length of spiral 26 slides down an incline chute 28 in the feed mechanism 27. A revolving roller 29 which is powered by a suitable source of rotary motion such as the motor 30 shown in Fig. 5 and the belt 31, is located in the bottom of the feed mechanism trough 32. The roller 29 is provided with a continuous helical rib 33 on the outside thereof, which rib engages the convolutions of the spiral binding element 26 so as to urge it laterally in the direction of the binding station.

A feed mandrel 34 is disposed within the feed mechanism trough so as to overlie the roller 29 at the discharge end of the feed mechanism 27. The mandrel 34 is positioned so as to lie closer to the back of the trough 32 than the front thereof, as shown in Fig. 5.

The mandrel 34, best shown in Figs. 4, 5 and 6, is cylindrical in shape for that portion of its length which overlies the roller 29. As the mandrel 34 approaches the binding station of the device, it increases in diameter, as indicated at 35, until its outside diameter is only slightly greater than the outside diameter of the spirally wound binding material 26 (best shown in Figure 8).

The enlarged portion 36 of the mandrel 34 is provided with a helical groove 37 which corresponds in pitch to that of the binding material 26. The groove 37 is only slightly smaller than the inside diameter than the spiral binding material 26. The rotation of the roller 29 forces the spiral binding material against the back of the trough 32 and causes it to move through the feed device and slip upon the cylindrical portion of the mandrel 34.

When the binding element 26 reaches the tapered portion 35 of the mandrel 34, its travel is impeded. Nevertheless, the rib 33 on the roller 29 continues to urge it forward, with the result that the resilient binding element 26 alternately moves forward, jumps clear of the rib 33 and springs backward. This vibration results in a rotary motion to the strip 26, causing it to find its way around the large part 36 of the mandrel 34 by way of the groove 37. The spiral binding strip 26 thus proceeds along the mandrel 34. The binding strip 26 is then in position to be fed into the assembled sheaf of papers, generally indicated in Fig. 1, at 39.

The mandrel 34 is supported upon the table of the binding station by a block 42. The block 42 is provided with vertical adjustable studs 43 which secure the mandrel 34 to the said block 42. The block 42 is also horizontally adjustable by reason of screws 44 and slots 45 provided in the said block. In this manner the mandrel 34 may be adjusted for various pitches of binding strips and also to insure the smooth operation of the machine.

Figure 2:
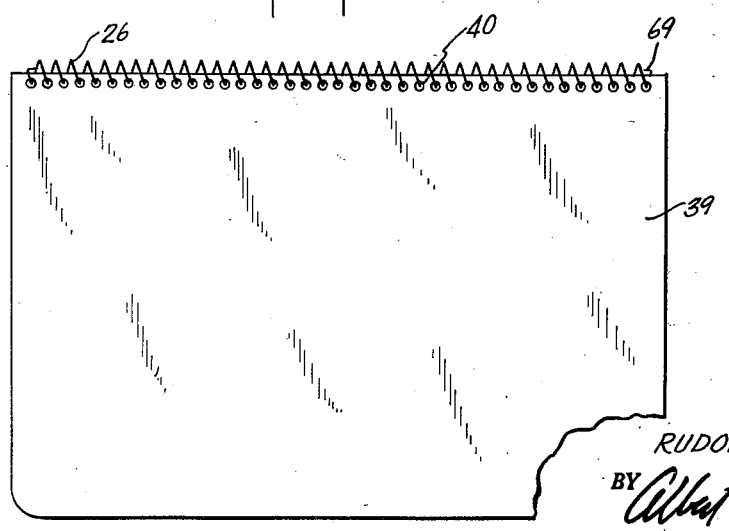
Figure 2 is a view in side elevation of the sheaf of papers with the binding inserted therein.
Figure 3:
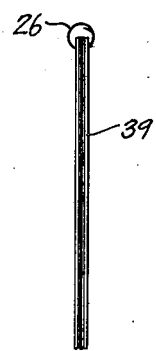
Figure 3 is an end view of the bound book shown in Figure 2.
Figure 14:
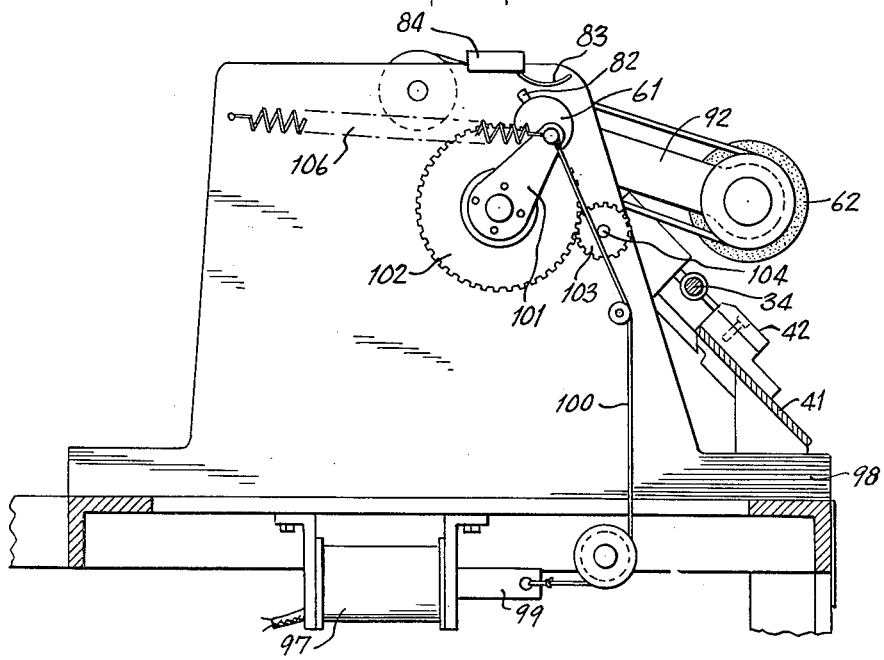
Figure 14 is an end view of the binding section of the present device, as viewed from line 14—14 in Figure 13, looking in the direction indicated by the arrows, and showing the severing actuating mechanism.
Figure 15:
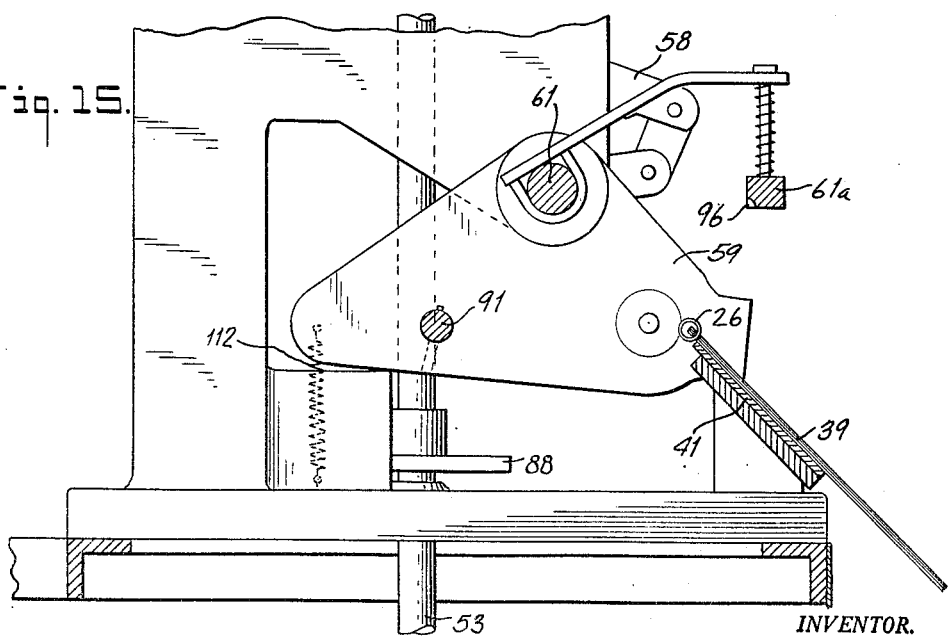
Figure 15 is a cross-sectional view, taken on line 15—15 in Figure 1, somewhat enlarged.

The sheaf of papers have been previously provided with a plurality of perforations 40, best shown in Figs. 2 and 6, which perforations are in register from sheet to sheet so as to present a plurality of paths running through the sheaf of papers from cover to cover.

The support table 41 shown in Figs. 1, 6, 12, 14 and 15 is inclined at a convenient angle to facilitate the binding operation. A comb member 46 is secured to the upper surface of the table 41 so as to receive the pages of the book thereon. The comb member 46 comprises a plate 47 having a series of teeth 48 along the upper edge thereof, which teeth are spaced so as to be capable of lying in register with the holes 40 of the pages to be bound. In this manner the binding edge of the sheets 39 are supported, while providing an unobstructed path for the spiral binding element 26 to travel therethrough.

The table 41 is provided with an end stop 76 so as to position the sheaf of papers 39 thereon with respect to its lateral position upon the table 41. (Figures 6 and 10.) Spaced guide stop members 77 are provided at each end of the table 41 above the comb member 46, for the purpose of positioning the edge of the sheaf 39 which is to be bound. The positioning elements 76, 77 make it extremely easy for the operator to place the sheaf within the machine at the precise point necessary to bring the holes 40 into register with the comb 46, and in position to receive the spiral binding element 26.

Figure 16:
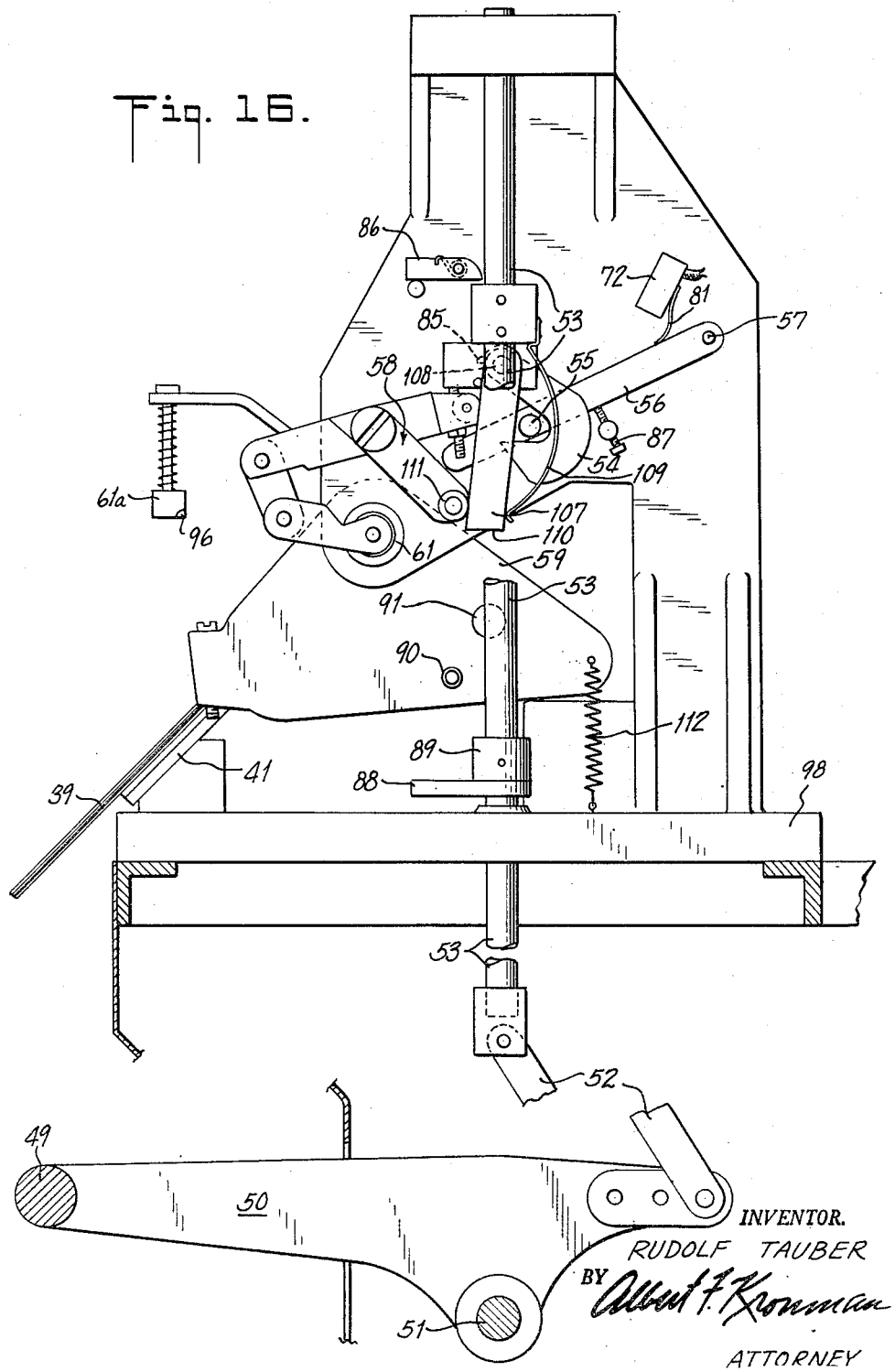
Figure 16 is an end view, somewhat enlarged, taken substantially on line 16—16 in Figure 1, looking in the direction indicated by the arrows.

When the operator of the spiral binding machine steps upon the foot treadle 49, best shown in Figures 1 and 16, it causes an arm 50 to rotate about a pivot point 51, thereby operating a link 52. The link 52 forces a vertical shaft 53 upward through the machine. As the shaft 53 rises, it carries with it a hook member 54, which engages a pin 55.

The pin 55 is connected to an arm 56 which is rotatably mounted at one end, as indicated at 57. The free end of the arm 56 engages a toggle linkage, generally indicated at 58, which linkage serves to rotate a clamp 61, to which is secured a clamp 61a. A twist guiding comb is machined into the edge of the clamp 61a, as indicated at 96 in Figures 12 and 16. Located at each end of the binding station are pivotally mounted blocks 59 and 60, best shown in Figures 7 and 16. These blocks 59, 60 are interconnected by a bar 91.

As the rod 53 continues upwardly in response to pressure on the foot treadle 49, the toggle linkage 58 locks and secures the clamp 61s to the top of the sheaf of papers 39, as shown in Figure 12. The lever 56, which is carried by the hook 54, bears against the actuating arm 81 of a microswitch 72. The microswitch 72 serves to activate the twist forming section of the device, whereby another spiral binding element is formed and ejected into the feeding station 27.

Simultaneously, with the forming of the binder, the motion of the clamp shaft 61 imparted to it by the toggle linkage 58 causes a pin 82 (best shown in Figure 14), mounted on the end of the shaft 61 to engage the trip lever 83 of another microswitch 84. The microswitch 84 is normally in a closed position and the operation of the shaft 62 causes the pin 82 to break the circuit controlled by the switch 84. The microswitch 84 governs the flow of current to the feed motor 30 (see Figure 5), which in turn operates the feed roller 29. In this manner the spiral binding element 26 for the next cycle is caused to lie within the feeding station 27 until the preceding binding operation is concluded.

As the toggle linkage 58 locks, a detent 85, which extends from the shank of the hook member 54, is brought into contact with a trip 86 mounted upon the main casting of the binding member. The trip member 86 rotates the hook 54 which in turn releases the pin 55, permitting the arm 56 to fall downwardly into its original position ready for the succeeding operation.

The downward travel of the arm 56 is limited by a stop 87. As the rod 53 continues to move up, an arm 88, carried by a collar 89 secured to said rod, is brought into contact with a roller pin 90 extending laterally from the block 59. By means of the roller pin 90 the arm 88 causes the blocks 59, 60 to rotate slightly. The blocks 59, 60 are pivotally mounted on the clamp shaft 61 and linked together by the bar 91. As the blocks 59, 60 tilt they carry with them the drive roller 62, which is secured to the end of an arm 92 which extends from the block 60 (Figure 7). The driving roller 62 is rotated by means of a belt 93 through a countershaft 94 and a second belt 95, which is in turn driven by the motor 70.

The rotation of the block 60 brings the driving roller 62 into contact with the spiral binding element 26, with the result that the element 26 rotates and threads its way through the holes 40 in the sheaf of papers 39, passing in between the teeth 48 of the comb 46, as well as the twisting guide comb 96 in the clamp 61a. It has been found that a more satisfactory driving result is produced when a portion of the surface of the drive roller 62 is cut away, so that the contact of the roller 62 with the binding element 26 is intermittent. The drive roller 62 is preferably made of rubber, neoprene, or some other resilient material.

As the binding element is driven through the sheaf of papers 39, it passes between the jaws of spaced cutter members 38, 38a At the end of the travel of the binding element 26, the forwardmost portion of the binding element 26 strikes the trip 65 of the microswitch 66 located adjacent the cutter member 38a. (See Figures 10 and 11.) The microswitch 66 closes an electrical circuit which energizes the solenoid 97 mounted beneath the frame 98, best shown in Figure 14.

The arm 99 of the solenoid 97 has secured thereto a cable 100, which in turn is fastened to an arm 101, which arm is secured to a gear 102. The gear 102 is in mesh with a second gear 103, which is fastened to a shaft 104. The shaft 104 is coupled to the cutter members 38, 38a, by gears 105. The rotation of the shaft 104 causes the jaws 63 of the cutter members 38, 38a to turn upon the spiral binding element 26. The rotation of the jaws 63, as best shown in Figures 11 and 13, causes the jaws 63 to sever the binding element 26 to the finished length to fit the sheaf of papers. Further rotation of the jaws 63 causes the ends of the binding element 26 to be bent back upon themselves inwardly, as shown in Figures 2 and 13, so as to lock the binding element in place.

As the forwardmost end of the binding element 26 is severed by the jaws 63, it releases the trip 65 of the microswitch 66. The solenoid arm 99 returns to its original position due to the operation of a spring 106, best shown in Figure 14. The movable jaws 63 of the cutter members 38, 38a rotate and assume their original position.

Having finished the binding of the sheaf of papers, the operator releases the treadle bar 49 which returns to its original position, by reason of the operation of a spring (not shown). As the treadle arm 50 returns to its original location the shaft 53 is pulled downwardly, carrying with it the trip arm 107. The trip arm 107 is pivotally mounted, as indicated at 108, and is urged in a clockwise direction by the flat spring member 109. Accordingly, as the trip arm 107 moves down with the rod 53, its lowermost end 110 comes in contact with the extended end 111 of the toggle linkage 58, forcing the said linkage down and tripping the lock of the linkage, so that it springs back to its original position, shown in Figure 16.

The action of the toggle linkage 58 is aided by the coil spring 112, which connects the block 59 to the frame 98 of the binding device. As the toggle linkage 58 returns to its original position, it rotates the shaft 61, thereby releasing the clamp 61a from the sheaf of papers.

The bound sheaf of papers thereupon drops from the table 41 into the chute 74, which is located immediately below the said table. The chute 74 communicates with a bin 75 located beneath the binding machine (Figure 1).

The entire machine is now in a condition to repeat the above-described operation, upon pressure by the operator upon the foot treadle 49.

From the foregoing it will be seen that there has been provided a spiral book binding device, capable of inserting a spirally wound binder into a sheaf of papers in a continuous operation, with a minimum amount of handling and time consumed. The machine is adapted to perform the entire binding operation from the fashioning of a wire into a binder, right through to the finished product.

The above-described machine is capable of wide variation as to size of binder; length of binder; thickness of binding material and nature of binding material to be used. The machine is adapted to employ all types of wire and plastic binding substances. The hands of the operator are free at all times to assemble and guide the sheaf of papers into the machine. While the binding is being driven through one sheaf of papers, the operator's hands are free to pick up the next sheaf to be bound, so that as soon as the jaws release the bound book, the following sheaf may be placed upon the comb of the binding table for the next cycle.

Having thus fully described the invention, what is claimed as new and desired to be secured by Letters Patent of the United States, is:

1. A binding machine for inserting helically wound binding elements comprising, a trough to receive binding elements, conveyor means consisting of a roller having a helical rib thereon disposed in the bottom of said trough, a source of rotary power connected to said roller for moving said binding element axially through the trough, a binder receiving two diameter mandrel disposed upon the binding machine so as to overlie the conveyor means parallel to the longitudinal axis of the chute but rearwardly offset from said axis and said mandrel being of a length to extend beyond the discharge end of the trough, said extended portion of the mandrel being provided with a helical groove therein having a root diameter substantially equal to the inside diameter of the binding element, said grooved section being cut away at one portion to expose the said binding element, and a tapered portion on said mandrel between the grooved part and the remainder of said mandrel, a binding section adjacent the discharge end of said mandrel, a binding table on said binding section, said table being adapted to receive an edge-perforated sheaf of papers to be bound thereon, a comb member secured to the upper edge of said table, spaced blocks rotatably mounted above each end of the binding table, a clamp secured at each end to the blocks, said clamp being provided with a comb-like edge, means adapted to rotate said blocks to bring the clamps into gripping contact with the sheaf of papers to be bound with the clamp comb in register with the table comb, switch means engageable by the block, rotating means for energizing then binding element forming means as the clamp moves toward the table, and a second switch means responsive to the movement of the block adapted to stop the conveyor means during the binding portion of the cycle, spaced cutter members overlying the table, each of said cutters having a fixed and a movable jaw therein, said jaws in their open position being adapted to pass therebetween the binding element, a drive roller overlying the cut away discharge portion of the mandrel, said roller being cut away along one portion of its periphery so as to impart an intermittent drive, an arm supporting said roller, said arm being pivotally secured as by attachment to one of said blocks to the binding section, a source of rotary power connected to the roller, means consisting of said block rotating means for pivoting the arm to bring the drive roller into contact with the binding element on the mandrel so as to rotate the binding element and drive said binder through the binding section and the edge perforations of the sheaf of papers therein in an axial direction, and means consisting of an electrical switch overlying the binding table operated by the binding element as it completes its traverse of the sheaf of papers and a solenoid connected to said switch and linked to the cutter members to rotate the movable jaws of the cutter members and cut the binder to a desired length.

2. A binding machine for inserting helically wound binding elements comprising, a trough to receive binding elements, conveyor means in the bottom of said trough for moving the binding elements axially through the trough, a mandrel having a reduced cylindrical portion at the trough end thereof, an enlarged grooved portion at the opposite end of the mandrel and a tapered portion joining the reduced and grooved portions, said reduced portion being disposed in the longitudinal path of the binding element and above the conveyor means, a binding section adjacent the discharge end of said mandrel, a binding table on said binding section, said table being adapted to receive an edge-perforated sheaf of papers to be bound thereon, a drive roller overlying the discharge portion of the mandrel, an arm supporting said roller, said arm being pivotally secured to the binding section, a source of rotary power connected to the roller and means for pivoting the arm to bring the drive roller into contact with the binding element on the mandrel to rotate the binding element and drive said binder through the binding section and the edge perforations of the sheaf of papers therein in an axial direction.

3. A binding machine for inserting helically wound binding elements comprising, a trough to receive binding elements, conveyor means consisting of a roller having a helical rib thereon in the bottom of said trough, a source of rotary power connected to said roller for moving the binding elements axially through the trough, a mandrel having a reduced cylindrical portion at the trough end thereof, an enlarged grooved portion at the opposite end of the mandrel and a tapered portion joining the reduced and grooved portions, said reduced portion being disposed in the longitudinal path of the binding element and above the conveyor means, a binding section adjacent the discharge end of said mandrel, a binding table on said binding section, said table being adapted to receive an edge-perforated sheaf of papers to be bound thereon, a drive roller overlying the discharge portion of the mandrel, an arm supporting said roller, said arm being pivotally secured to the binding section, a source of rotary power connected to the roller and means for pivoting the arm to bring the drive roller into contact with the binding element on the mandrel to rotate the binding element and drive said binder through the binding section and the edge perforations of the sheaf of papers therein in an axial direction.

4. A binding machine for inserting helically wound binding elements comprising, a trough to receive binding elements, conveyor means consisting of a roller having a helical rib thereon in the bottom of said trough, a source of rotary power connected to said roller for moving the binding elements axially through the trough, a mandrel having a reduced cylindrical portion at the trough end thereof, an enlarged grooved portion at the opposite end of the mandrel and a tapered portion joining the reduced and grooved portions, said reduced portion being disposed in the longitudinal path of the binding element and above the conveyor means, said grooved portion of the mandrel being provided with a helical groove substantially equal to the inside diameter of the binding element, said grooved section being cut away at one portion to expose the said binding element, a binding section adjacent the discharge end of said mandrel, a binding table on said binding section, said table being adapted to receive an edge-perforated sheaf of papers to be bound thereon, a drive roller overlying the cut away discharge portion of the mandrel, an arm supporting said roller, said arm being pivotally secured to the binding section, a source of rotary power connected to the roller and means for pivoting the arm to bring the drive roller into contact with the binding element on the mandrel to rotate the binding element and drive said binder through the binding section and the edge perforations of the sheaf of papers therein in an axial direction.

5. A binding machine for inserting helically wound binding elements comprising, a trough to receive binding elements, conveyor means in the bottom of said trough for moving the binding elements axially through the trough, a mandrel having a reduced cylindrical portion at the trough end thereof, an enlarged grooved portion at the opposite end of the mandrel and a tapered portion joining the reduced and grooved portions, said reduced portion being disposed in the longitudinal path of the binding element and above the conveyor means, a binding section adjacent the discharge end of said mandrel, a binding table on said binding section, said table being adapted to receive an edge-perforated sheaf of papers to be bound thereon, a comb member secured to the upper edge of said table, spaced blocks rotatably mounted above each end of the binding table, a clamp secured at each end of the blocks, said clamp being provided with a comb-like edge, means adapted to rotate said blocks to bring the clamps into gripping contact with the sheaf of papers to be bound with the clamp comb in register with the table comb, a drive roller overlying the discharge portion of the mandrel, an arm supporting said roller, said arm being pivotally secured by attachment to one of said blocks to the binding section, a source of rotary power connected to the roller and means consisting of said block rotating means for pivoting the arm to bring the drive roller into contact with the binding element on the mandrel to rotate the binding element and drive said binder through the binding section and the edge perforations of the sheaf of papers therein in an axial direction.

6. A binding machine for inserting helically wound binding elements comprising, a trough to receive binding elements, conveyor means in the bottom of said trough for moving the binding elements axially through the trough, a mandrel having a reduced cylindrical portion at the trough end thereof, an enlarged grooved portion at the opposite end of the mandrel and a tapered portion joining the reduced and grooved portions, said reduced portion being disposed in the longitudinal path of the binding element and above the conveyor means, a binding section adjacent the discharge end of said mandrel, a binding table on said binding section, said table being adapted to receive an edge-perforated sheaf of papers to be bound thereon, a drive roller overlying the discharge portion of the mandrel, said roller being cut away along one portion of its periphery to impart an intermittent drive, an arm supporting said roller, said arm being pivotally secured to the binding section, a source of rotary power connected to the roller and means for pivoting the arm to bring the drive roller into contact with the binding element on the mandrel to rotate the binding element and drive said binder through the binding section and the edge perforations of the sheaf of papers therein in an axial direction.

References Cited in the file of this patent

UNITED STATES PATENTS

| 2,136,773 | Hanna | Nov. 15, 1938 |
| 2,300,544 | Freundlich | Nov. 3, 1942 |
| 2,532,443 | Freundlich | Dec. 5, 1950 |
| 2,638,609 | Penner | May 19, 1953 |
| 2,649,120 | November | Aug. 18, 1953 |
| 2,721,585 | McClimans | Oct. 25, 1955 |